Jan. 10, 1928.　　　　V. C. NICOLELLO　　　　1,655,659
DENTAL DRILL
Filed Dec. 4, 1925
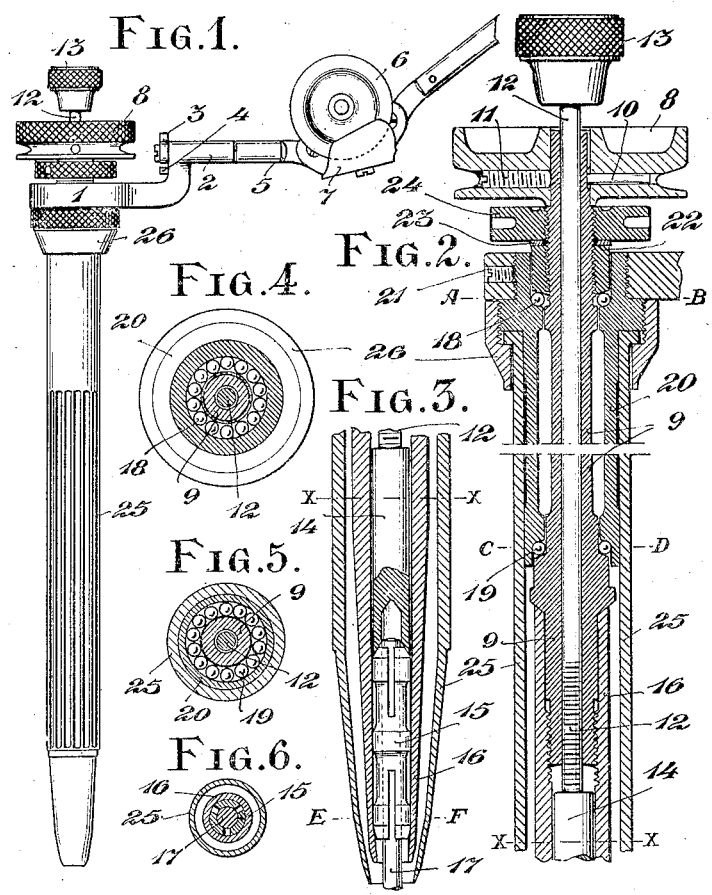
Inventor
Vicente C. Nicolello
By [signature]
Atty Patented Jan. 10, 1928.

1,655,659

UNITED STATES PATENT OFFICE.

VICENTE CONSTANTINO NICOLELLO, OF BUENOS AIRES, ARGENTINA.

DENTAL DRILL.

Application filed December 4, 1925. Serial No. 73,235.

This descriptive schedule refers to a drill for dental clinics, the construction of which has been especially planned to give to the boring and other usual tools, a speed that hitherto has been unattainable on the different systems of drills in use.

Due to the improvements which form the object of this application, it is now possible to attain to speeds of 15,000 revolutions and over per minute without the tool becoming heated and without causing the operator to feel vibration, or that he may incline to slip from the point at which he is working: further, it does not increase the wear of the tool.

After innumerable experiments carried out for the purposes of finding a solution to this most important problem, I have attained so high a degree of perfection, that, for example, anæsthetics can be entirely dispensed with, whether for the extirpation of nerves or for the other dental operations which are not at present effected, without the sensibility of the part operated upon being deadened by such means. For this reason the patients are not only relieved of all trouble caused by a surgical intervention, but also from the possible disturbances which the presence of anæsthetics in the blood may produce in some persons.

It is, then, evident that this invention, while making a notable improvement in the constructive system of dental drill holders, implies an evolution towards the simplification of the operative technique which will bring about enormous benefits to humanity.

As will be shown later on, I have constructed this drill holder, or operating instrument which comprises the chuck in which the boring and other tools are fixed, in such a form that the rotary part does not rub against the sleeve or external covering, thus avoiding all possible friction and making it rotate on rings of steel balls. Hitherto ball bearings have not been utilized in dental drills, as the relatively moderate speed in which these tools were worked permitted the usual friction mounting. But when in order to get the above mentioned results I experimented at high speeds, I first had to surmount the difficulties of the constructive defects of the chucks, since the ordinary instruments became heated to such a degree that made it impossible to operate. Logically the motor system, whether electric or mechanical, will have to be constructed in a form that will permit the use at will of different speeds which will prove, according to experience, the most efficient for operating at certain points, such as the nerves, bones, dermis, etc.; this result can be obtained by varying the coil systems in the fields of the electric motors, and continuing with different coils or by the different systems of electric transmission multipliers that are in use.

In the accompanying drawing

Fig. 1 is a side elevation of a drill holder or chuck for dental clinics, improved according to my invention.

Fig. 2 is a longitudinal section of same on a larger scale.

Fig. 3 shows an extension of Fig. 2 from the lines x—x.

Fig. 4 is a section along the line A—B in Fig. 2.

Fig. 5 is a section along the line C—D in Fig. 2.

Fig. 6 is a section along the line E—F in Fig. 2.

In these drawings 1 is the head piece or frame in which the complete chuck is fixed; this frame in its turn, being supported at the extremity of the articulated extension 2, which permits the whole chuck to revolve, this movement being limited by the catch 3 and the buffer 4. Said catch is fastened to the bolt 5 which forms the extremity of the articulated arm, and is provided with two pulleys 6, kept in position by the double articulation 7, and by means of which the wire, belt etc. circulate, thereby transmitting the rotatory movement to the chuck. For this purpose is a pulley 8, suitably aligned and keyed on the upper extremity of the hollow shaft 9, where a pin 10 bolts it in a groove of the said shaft; fixing it in a suitable position by means of an adjusting screw 11. The shaft 9 is hollow in order to allow the passage of the rod 12 which is screwed at its lower extremity and is moved by the stud 13, thus allowing of the closing of the chuck. This latter is formed of the hollow pressure thrust member 14 and of the double clamp 15, which by the action of the annular, conical lower end of the buffer 14 and also by the reduced lower end of the sleeve 16, makes when the buffer 14 is adjusted, both extremities of the clamp grip upon the boring tool etc. 17, holding it absolutely fast. Said shaft 9 rotates on steel ball bearings 18 and 19 in the interior of the collar 20, fastened by means of a screw thread and a set screw 21 to the head piece 1. The ball bearing 18, or better said the position of the hollow shaft 9 with regard to both bearings, is adjusted by means of the ring 22 threaded on to said shaft in combination with the washer 23 and the capstan nut 24, which in its turn is kept in position so as not to allow it to be loosened by direct contact with the pulley 8 adjustable along the upper end of shaft 9.

The collar 20 and the rotatory sleeve 16 are covered by the external casing 25 which is fixed to the whole by the means of the connecting nut 26 through the cavity therein and by means of the circular enlargement of the casing.

As can be seen in Figs. 2 and 3, the movement of the shaft 9 and the other solid parts thereof, give a rotary movement without the slightest friction against any of the stationary parts, only coming against the ball bearings. The external casing is thus free from all danger of heating, which in the usual apparatus the friction of the revolving part produces.

The hollow shaft 9 forms the bed of the lower ball bearings, while the collar forms the bed of the upper ball bearing. It is obvious that the disposition of the bearings may be varied as convenient, and the ball bearings may be substituted by roller bearings, suitably placed, the essential characteristics being the fact that the shaft with the upper parts united to the same, shall rotate without any friction with the contiguous fixed parts.

Having thus described and specified the nature of my invention and the manner of putting it into practice, I claim as my exclusive invention and property:—

In a hand piece for dental engines, the combination with the head piece; of a collar secured at its upper end in the head piece having internal anti-friction bearing seats at its ends, a hollow shaft in said collar having a co-operating anti-friction bearing seat for the lower end of said collar, a ring screwed to said shaft forming a co-operating bearing seat for the upper bearing, a sleeve forming a continuation of the hollow shaft, tool clamping devices in said sleeve, a casing for said collar, shaft and sleeve having a flange at its upper end, and a nut engaging the collar and flange to hold the casing to said collar, said casing being out of contact with all rotating parts.

In testimony that I claim the foregoing as my invention, I have signed by name.

VICENTE CONSTANTINO NICOLELLO.